US012658505B2

(12) United States Patent
Ye et al.

(10) Patent No.: US 12,658,505 B2
(45) Date of Patent: Jun. 16, 2026

(54) BATTERY PACK, MANUFACTURING METHOD THEREFOR, AND ELECTRIC DEVICE

(71) Applicant: CONTEMPORARY AMPEREX TECHNOLOGY (HONG KONG) LIMITED, Hong Kong (CN)

(72) Inventors: Weida Ye, Ningde City (CN); Wei Wang, Ningde City (CN); Peng Yan, Ningde City (CN); Xiaoteng Huang, Ningde City (CN); Yanlong Gu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 629 days.

(21) Appl. No.: 18/103,501

(22) Filed: Jan. 31, 2023

(65) Prior Publication Data

US 2023/0170554 A1 Jun. 1, 2023

Related U.S. Application Data

(63) Continuation of application No. PCT/CN2021/090263, filed on Apr. 27, 2021.

(30) Foreign Application Priority Data

Jul. 31, 2020 (CN) .......................... 202010757351.2

(51) Int. Cl.
*H01M 10/658* (2014.01)
*H01M 10/6556* (2014.01)
*H01M 50/209* (2021.01)

(52) U.S. Cl.
CPC ..... *H01M 10/658* (2015.04); *H01M 10/6556* (2015.04); *H01M 50/209* (2021.01)

(58) Field of Classification Search
CPC ........... H01M 10/658; H01M 10/6556; H01M 50/209
(Continued)

(56) References Cited

U.S. PATENT DOCUMENTS

2011/0104547 A1 5/2011 Saito et al.
2011/0206948 A1* 8/2011 Asai .................... H01M 10/617
429/7
(Continued)

FOREIGN PATENT DOCUMENTS

CN 102054946 A 5/2011
CN 102163702 A 8/2011
(Continued)

OTHER PUBLICATIONS

International Search Report and Written Opinion mailed on Jul. 27, 2021, received for PCT Application PCT/CN2021/090263, filed on Apr. 27, 2021, 16 pages including English Translation.
(Continued)

*Primary Examiner* — Allison Bourke
*Assistant Examiner* — Robert Gene West
(74) *Attorney, Agent, or Firm* — XSENSUS LLP

(57) ABSTRACT

An embodiment of the application provides a battery pack, a manufacturing method therefor, and an electric device. The battery pack includes a battery unit and a support. The battery unit includes two or more secondary batteries, and has an intermediate portion and two ends. The two ends are located on both sides of the intermediate portion in a direction in which the secondary batteries are arranged. The support is configured to support the battery unit, and includes a body and a heat-resistant component arranged thereon. The heat-resistant component is arranged corresponding to at least one of the ends, so that the heat exchange amount of the end passing through the support is
(Continued)

less than the heat exchange amount of the intermediate portion passing through the support. The temperature difference between the end and the intermediate portion of the battery unit is reduced, and the working efficiency is improved.

20 Claims, 12 Drawing Sheets

(58) Field of Classification Search
USPC ........................................................ 429/120
See application file for complete search history.

(56) References Cited

U.S. PATENT DOCUMENTS

| | | |
|---|---|---|
| 2016/0013526 A1 | 1/2016 | Uchiyama et al. |
| 2017/0104252 A1 | 4/2017 | Wünsche et al. |
| 2019/0245168 A1 | 8/2019 | Qin et al. |

FOREIGN PATENT DOCUMENTS

| | | |
|---|---|---|
| CN | 206346424 U | 7/2017 |
| CN | 207183462 U | 4/2018 |
| CN | 207602744 U | 7/2018 |
| CN | 207800719 U | 8/2018 |
| CN | 110224204 A | 9/2019 |
| CN | 209344284 U | 9/2019 |
| CN | 209592262 U | 11/2019 |
| CN | 209880766 U | 12/2019 |
| CN | 210074097 U | 2/2020 |
| CN | 210086523 U | 2/2020 |
| CN | 112310535 A | 2/2021 |
| IN | 208923207 U | 5/2019 |
| JP | 2020-035688 A | 3/2020 |
| WO | 2013/146561 A1 | 10/2013 |

OTHER PUBLICATIONS

First Office Action mailed on Jun. 17, 2022, received for JP Application 202010757351.2, 22 pages including English Translation.

Second Office Action mailed on Nov. 3, 2022, received for JP Application 202010757351.2, 22 pages including English Translation.

Office Action issued May 25, 2023 in Chinese Patent Application No. 202010757351.2 with English Concise Explanation of Relevance, 10 pages.

Notice of the Granting of a Patent Right for an Invention issued Aug. 28, 2023 in Chinese Patent Application No. 202010757351.2 with English translation thereof, 5 pages.

Extended European Search Report issued Jun. 20, 2024 in European Patent Application No. 21850471.0.

\* cited by examiner

1

10

70

50

20

30

60

40

Z

X

Y

A

A

A-A

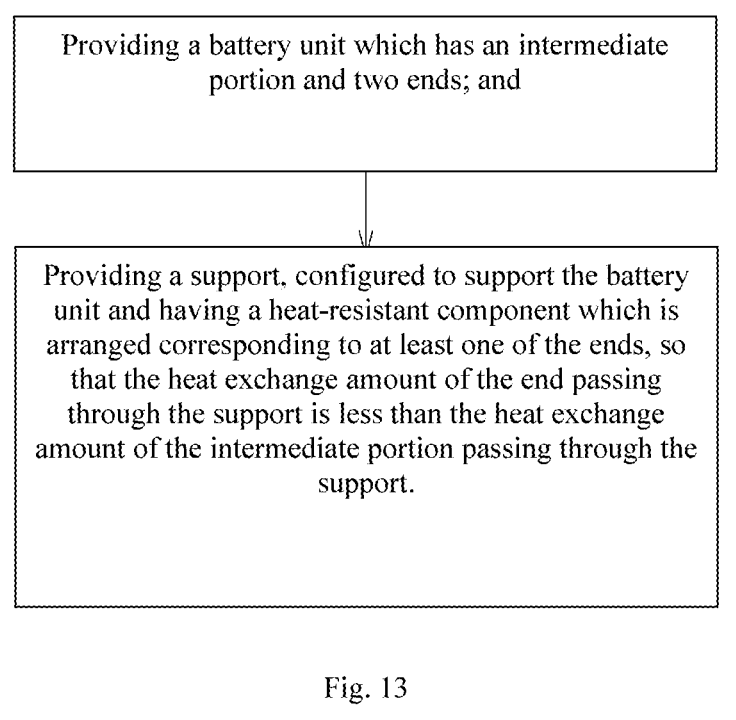

Providing a battery unit which has an intermediate portion and two ends; and

Providing a support, configured to support the battery unit and having a heat-resistant component which is arranged corresponding to at least one of the ends, so that the heat exchange amount of the end passing through the support is less than the heat exchange amount of the intermediate portion passing through the support.

Fig. 13

BATTERY PACK, MANUFACTURING METHOD THEREFOR, AND ELECTRIC DEVICE

CROSS-REFERENCE TO RELATED APPLICATIONS

This application is a continuation application of PCT/CN2021/090263, filed on Apr. 27, 2021, which claims the priority of Chinese Patent Application No. 202010757351.2, filed on Jul. 31, 2020 and entitled "Battery Pack, Manufacturing Method Therefor, and Electric Device", all of which are incorporated in its entirety herein by reference.

TECHNICAL FIELD

The application relates to the technical field of batteries, in particular to a battery pack, a manufacturing method therefor, and an electric device.

BACKGROUND ART

The concept of sustainable development has been widely recognized, making new energy sources as a good substitute to cope with the energy crisis. As one of the new energy sources, battery pack is attracting more and more attention. It may be used in electric vehicles as an important part of the electric source.

A Battery pack includes a plurality of battery units, each of which includes two or more secondary batteries arranged side by side. The secondary batteries themselves make certain demands on the temperature of the working environment, and may give full play to their own performance under the predetermined working environment, so as to ensure good energy conversion efficiency. However, when the overall performance of the battery pack becomes unstable in use, the working efficiency will be affected.

SUMMARY OF THE INVENTION

The application provides a battery pack, a manufacturing method therefor, and an electric device, aiming at solving the problem of unstable overall performance of the battery pack and improving the working efficiency of the battery pack.

In one aspect, the application provides a battery pack, which supports. The battery unit includes two or more secondary batteries, and has an intermediate portion and two ends. The two ends are located on both sides of the intermediate portion in a direction in which the secondary batteries are arranged. The support is configured to support the battery unit, and includes a body and a heat-resistant component arranged thereon. The heat-resistant component is arranged corresponding to at least one of the ends, so that the heat exchange amount of the end passing through the support is less than the heat exchange amount of the intermediate portion passing through the support.

According to the battery pack in one embodiment of the application, the heat-resistant component is arranged correspondingly on the end of the battery unit, making the heat exchange amount of the end less than that of the intermediate portion. In this way, the rate of temperature drop of the secondary battery at the end of the battery unit can be easily kept consistent with the rate of temperature drop near the intermediate portion, which is conducive to reducing the possibility of temperature difference between the battery unit near an end region and the battery unit near an intermediate portion region, reducing the possibility of unstable overall performance of the battery pack caused by temperature difference of the battery unit, and improving the working efficiency of the battery unit.

According to an embodiment of the application, the heat-resistant component includes a recessed portion extending in a direction away from the end.

The distance between the recessed portion and the end is larger than the distance between the support and the intermediate portion, so as to reduce the heat exchange amount of the end passing through the support; and the air in the cavity of the recessed portion can also play a heat resistance effect.

According to an embodiment of the application, the heat-resistant component further includes a thermal barrier which is arranged in the recessed portion and has smaller thermal conductivity compared with the body.

The thermal conductivity of the thermal barrier is less than that of the body, allowing the thermal barrier to reduce the heat exchange between the end of the battery unit and the support, and further reduce the heat exchange amount of the end of the battery unit passing through the support.

According to an embodiment of the application, the heat-resistant component further includes a heat insulator which is at least partially arranged in the recessed portion and has smaller thermal conductivity compared with the thermal barrier.

The thermal conductivity of the heat insulator is less than that of the thermal barrier, allowing the heat insulator to further reduce the heat exchange amount of the end of the battery unit passing through the support.

According to an embodiment of the application, the heat insulator is located atone side, away from the end of the battery unit, of the thermal barrier which is located between the end of the battery unit and the heat insulator.

According to an embodiment of the application, the surface, facing the end of the battery unit, of the heat insulator is flush with an opening of the recessed portion.

According to an embodiment of the application, the number of recessed portion is one, and the depth of the recessed portion gradually decreases in a direction from the end to the intermediate portion.

The depth of the recessed portion may be gradually changed depending on the temperature of the battery unit, which is conducive to further improving the consistency of heat exchange amount at the end of the battery unit, balancing the temperature between the end and the intermediate portion of the battery unit, and reducing the temperature difference between the end and the intermediate portion of the battery unit.

According to an embodiment of the application, the number of recessed portion is two or more, and the depth of the recessed portions decreases sequentially in a direction from the end to the intermediate portion.

The depth of the recessed portions may be gradually changed depending on the temperature of the battery unit, which is conducive to further improving the consistency of heat exchange amount at the end of the battery unit, balancing the temperature between the end and the intermediate portion of the battery unit, and reducing the temperature difference between the end and the intermediate portion of the battery unit.

According to an embodiment of the application, the number of the battery units is three or more, the three or more battery units are arranged side by side in a direction intersecting with the arrangement direction, and the heat-resistant component is correspondingly arranged on each secondary battery of at least one of the battery units in the two battery units located at the outermost side.

The heat-resistant component may reduce the heat exchange amount of the intermediate portion of the battery unit located at the outermost side, so that the heat exchange amount of the intermediate portion of the battery unit located at the outermost side is less than that of the intermediate portion of the battery unit located at the inner side, thereby contributing to the reduction of the temperature difference between the battery unit located at the outermost side and the battery unit located at the inner side.

According to an embodiment of the application, the body includes a heat exchange component which is configured to cool or heat the battery unit, and partially located at one side, away from the battery unit, of the heat-resistant component; or, the orthogonal projection of the heat-resistant component on the battery unit does not overlap with the orthogonal projection of the heat exchange component on the battery unit, and one part of the heat exchange component and the heat-resistant component are arranged corresponding to the end.

According to an embodiment of the application, the battery pack further includes a first end plate, a second end plate and an outer frame, a battery unit is arranged between the first end plate and the second end plate, the outer frame, inside which the battery unit is located, is connected to the support and the first end plate, and the heat-resistant component is correspondingly arranged at the end adjacent to the first end plate.

The provision of the heat-resistant component on the end of the battery unit may effectively reduce the heat exchange amount of the end of the battery unit passing through the support and the whole heat exchange amount of the battery unit, so as to effectively reduce the temperature difference between the end and the intermediate portion of the battery unit.

According to an embodiment of the application, the heat-resistant component is arranged corresponding to the secondary battery adjacent to the first end plate in all the secondary batteries located at the end.

According to an embodiment of the application, the support further includes a heat conducting component, and exchanges heat with the secondary battery through the heat conducting component located in an area other than the heat-resistant component.

According to an embodiment of the application, the surface, facing the end of the battery unit, of the body of the support may be a plane, the thickness of the heat-resistant component is equal to that of the heat conducting component, and the thermal conductivity of the heat-resistant component is less than that of the heat conducting component.

The thermal conductivity of the heat-resistant component is less than that of the heat conducting component, so that the heat exchange amount of the end of the battery unit passing through the support is less than that of other positions of the battery unit passing through the support.

According to an embodiment of the application, the support includes a first plate body and a second plate body, the second plate is located at one side, far away from the battery unit, of the first plate, and the first plate and the second plate are connected to form a fluid channel, into which fluid can be introduced to cool or heat the battery unit.

In another aspect, the application provides an electric device which includes the battery pack in the above embodiments.

In yet another aspect, the application provides a manufacturing method of a battery pack, which includes:

providing a battery unit which has an intermediate portion and two ends; and providing a support, configured to support the battery unit and having a heat-resistant component which is arranged corresponding to at least one of the ends, so that the heat exchange amount of the end passing through the support is less than the heat exchange amount of the intermediate portion passing through the support.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

FIG. 3 is a cutaway view along the direction A-A in FIG. 2a.

FIG. 13 is a flowchart of a manufacturing method of a battery pack according to an embodiment of the application.

Figures 1, 2A:
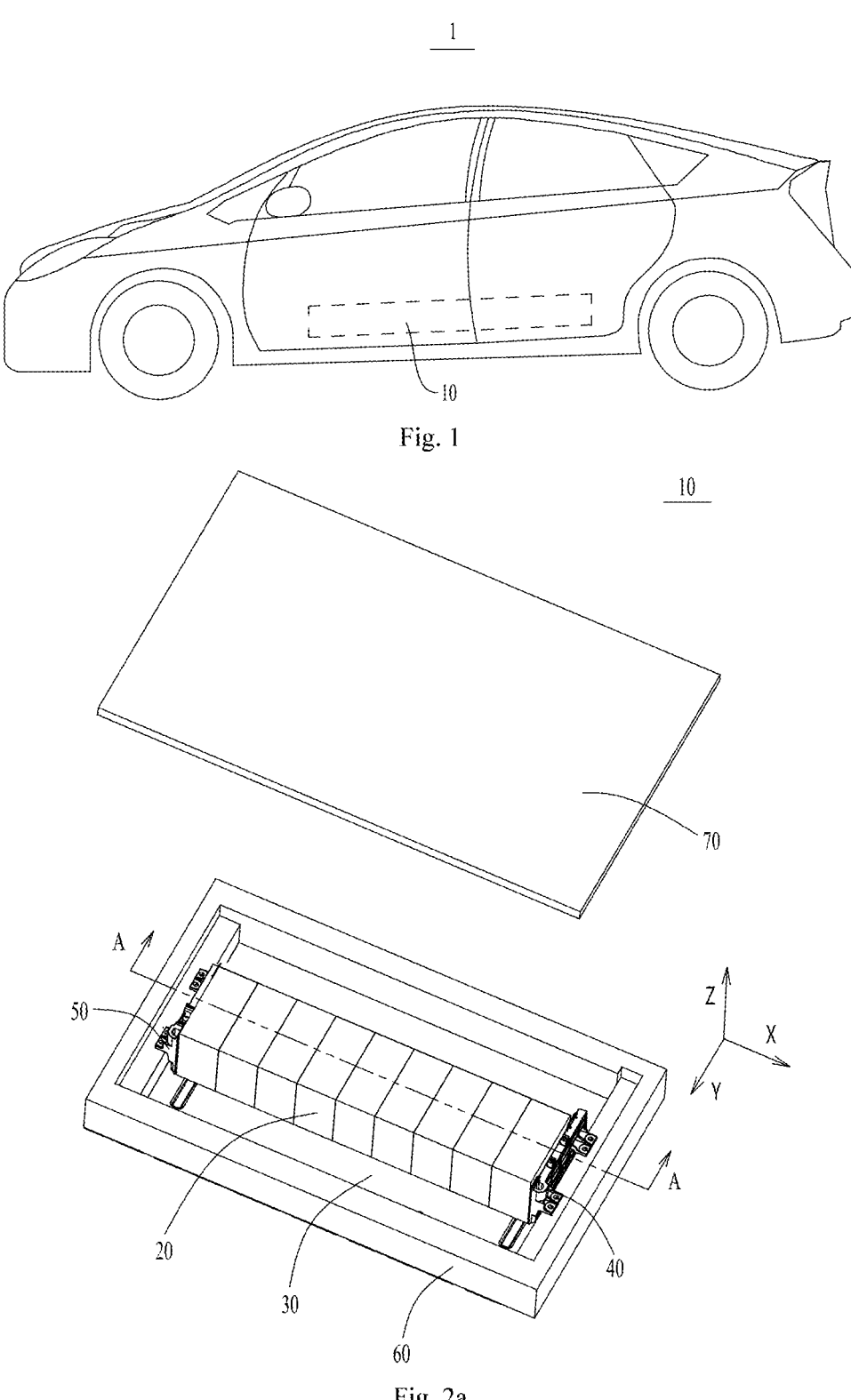
FIG. 1 is a schematic diagram of a vehicle disclosed in one embodiment of the application.
FIG. 2a is an exploded view of a battery pack disclosed in one embodiment of the application.

The drawings are not necessarily drawn to actual scale.

BRIEF DESCRIPTION OF THE NUMBERS 1. vehicle; 10. battery pack; 20. battery unit; 20a, end; 20b, intermediate portion; 21. secondary battery; 30. support; 30a. first plate body; 30b, second plate body; 31. body; 311. heat exchange component; 312. heat conducting component; 32. heat-resistant component; 321. recessed portion; 322. thermal barrier; 323. heat insulator; 40. first end plate; 50. second end plate; 60. outer frame; 70. cover body; 80. cross beam; X, arrangement direction; Y, width direction; Z, vertical direction.

SPECIFIC EMBODIMENTS

The implementation of the application will be further described in detail with reference to the accompanying drawings and the embodiments. The following detailed description of the embodiments and the accompanying drawings serve to illustrate principles of the application as examples, but are not intended to limit the scope of the application, that is, the application is not limited to the described embodiments.

In the description of the application, the following is to be noted: unless otherwise specified, "plurality" means two or more; the terms "upper", "lower", "left", "right", "inner", "outer", etc. indicate azimuthal or positional relations only for ease of description of the application and for simplicity of description, and are not intended to indicate or imply that the referenced device or element must have a particular orientation and be constructed and operative in a particular orientation, and thus may not be construed as a limitation on the application. Moreover, the terms "first", "second", "third", etc. are merely for descriptions and may not be understood as indication or implication of relative importance.

Nouns of locality appearing in the following description are orientation shown in the drawings and are not intended to limit the specific structure of the application. In the description of the application, it is also noted that unless expressly specified otherwise, the terms "mount", "connect", "connected", etc. are to be construed broadly and, for example, may be fixedly connected, or detachably connected, or integrally connected, and may be direct connected or indirect connected via an intermediary medium. The specific meanings of the above terms in the application may be understood on a case-by-case basis for those with ordinary skills in the art.

Having noticed the problem of instable performance of the battery pack, the applicant studied and analyzed structures and processing of the battery pack, and found that the working temperature of secondary batteries in the battery unit was different, which caused adverse effect on the overall performance of the battery pack. In a further study made by the applicant, since the end was located outside, the rate of temperature drop near the end was difficult to keep consistent with the rate of temperature drop near the intermediate portion, making a difference between the temperature near the end and the temperature near the intermediate portion.

Based on the above problems, the applicant improved the structure of the battery pack, and the embodiments of the application are further described below.

To better understand the application, embodiments of the application will be described below with reference to FIGS. 1 to 13.

With reference to FIG. 1, an embodiment of the application provides an electric device, which is powered by the battery pack 10. The device may be, but is not limited to, a vehicle, a ship, an aircraft, a power tool, etc. An embodiment of the application provides a vehicle 1 which includes a vehicle body and a battery pack 10 arranged thereon. The vehicle 1 may be a pure electric vehicle or a hybrid vehicle or an extended-range vehicle. The vehicle body is provided with an electric drive motor electrically connected to the battery pack 10. The battery pack 10 provides electrical energy to the electric drive motor. The electric drive motor is connected to a wheel on the vehicle body by means of a transmission mechanism so as to drive the vehicle to move.

Figure 2B:
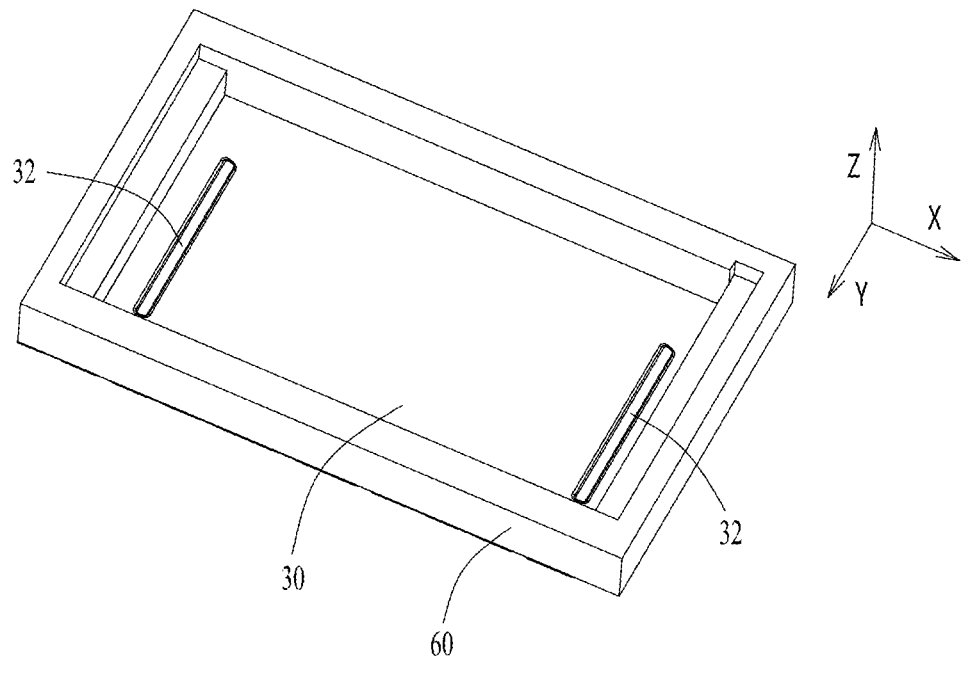
FIG. 2b is a schematic diagram of a partial structure of a battery pack disclosed in one embodiment of the application.
Figure 3:
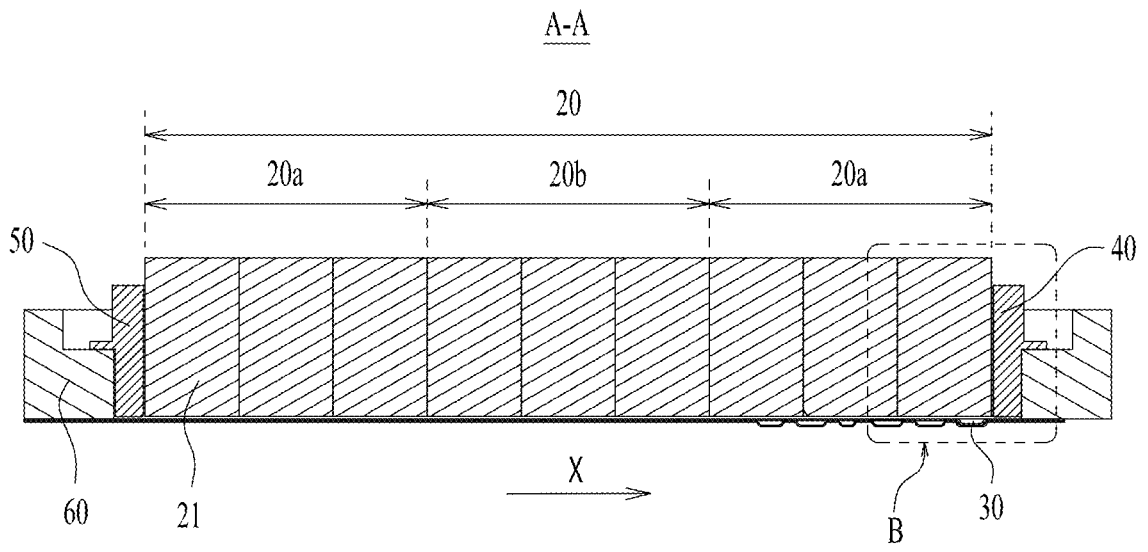

In one embodiment of the application, with reference to FIGS. 2a, 2b and 3, the battery pack 10 includes a battery unit 20, a support 30, an outer frame 60 and a cover body 70, and the battery unit 20 includes two or more secondary batteries 21 which may be arranged side by side. FIG. 2a shows the arrangement direction X of the secondary batteries 21 as well as the width direction Y and the vertical direction Z of the battery units 20. Here, the vertical direction Z refers to the height direction of the battery pack 10 after placed in the vehicle 1 in FIG. 1. The arrangement direction X is perpendicular to the vertical direction Z. The width direction Y of the battery units 20 is perpendicular to a plane where the arrangement direction X and the vertical direction Z are located. The battery unit 20 includes two ends 20a and an intermediate portion 20b. In the arrangement direction X, the two ends 20a are located on both sides of the intermediate portion 20b, respectively. Here, for convenience of description, the total size of the battery unit 20 is divided into three equal parts along the arrangement direction X, wherein each of the ends 20a accounts for one third, and the intermediate portion 20b accounts for one third.

In one example, with reference to FIGS. 2a and 3, the battery unit 20 includes nine secondary batteries 21, in which an end 20a includes three secondary batteries 21, and an intermediate portion 20b includes three secondary batteries 21. In another example, the battery unit 20 may include two secondary batteries 21, in which an end 20a includes ⅔ of one secondary battery 21, and an intermediate portion 20b includes ⅓ of one secondary battery 21 and ⅓ of the other secondary battery 21. In some other embodiments, the number of secondary batteries 21 included in the battery unit 20 is not limited to the above-mentioned nine or two, but may be flexibly selected according to actual product requirements.

With reference to FIG. 2a, the support 30 is used to support the battery unit 20. In the embodiment the support 30 is arranged at the bottom of the battery unit 20 to support the battery unit 20 in the vertical direction Z, and is connected to the outer frame 60. In some examples, the outer frame 60, inside which the battery unit 20 is disposed (i.e. the outer frame 60 is disposed around the battery unit 20), may be connected to the support 30 by welding or fasteners. The cover body 70 may be connected to the outer frame 60 to close the opening thereof, so that the battery unit 20 is located in a space formed by the support 30, the outer frame 60 and the cover body 70.

In some other embodiments, the support 30 is disposed at one side of the battery unit 20 to provide support for the battery unit 20 in the arrangement direction X or the width direction Y.

Figure 4:
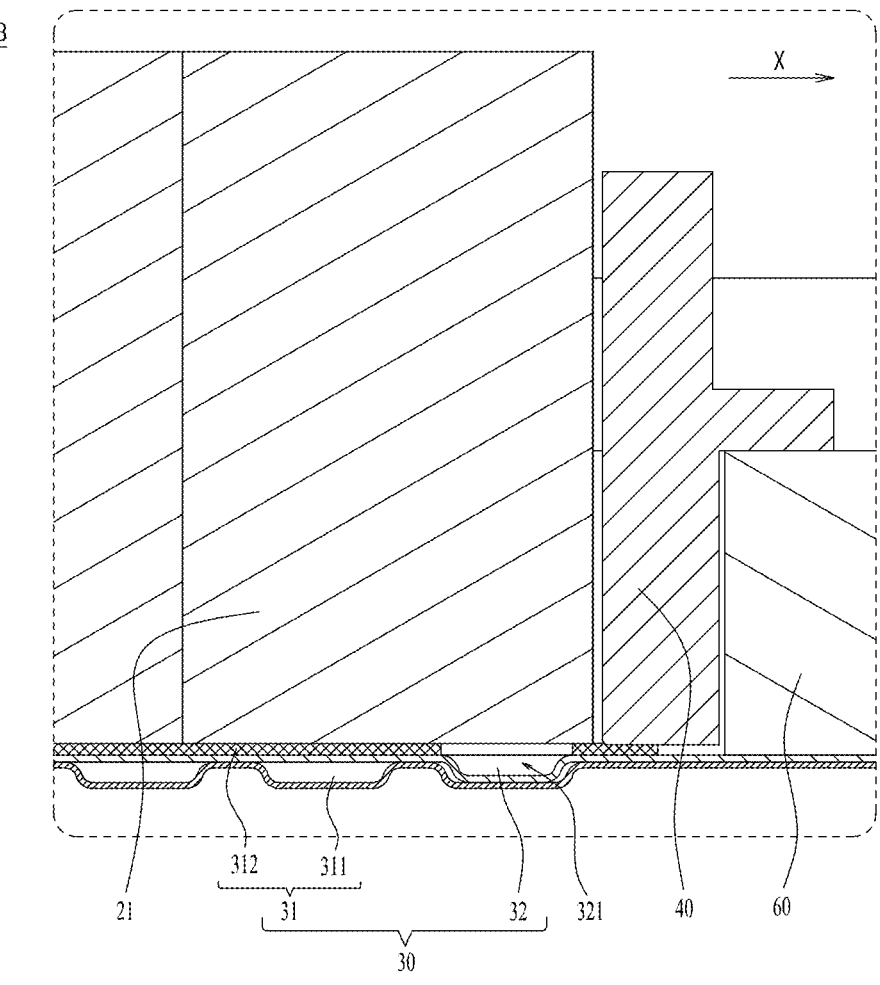
FIG. 4 is an enlarged view at B in FIG. 3.

In one embodiment of the application, with reference to FIG. 2b, FIG. 3 and FIG. 4, the support 30 includes a body 31 and a heat-resistant component 32 arranged thereon, and one end 20a of the battery unit 20 is correspondingly provided with the heat-resistant component 32, so that the heat exchange amount of the end 20a passing through the support 30 is less than that of the intermediate portion 20b of the battery unit 20 passing through the support 30.

Here, the corresponding arrangement means that the end 20a of the battery unit 20 corresponds to the heat-resistant component 32 in the same direction. In addition, the heat exchange amount may refer to the amount of heat exchanged per unit time. Understandably, the heat-resistant component 32 is correspondingly arranged on the end 20a of the battery unit 20, so that the heat exchange amount of the end 20a passing through the support 30 is less than that of the intermediate portion 20b passing through the support 30.

In the battery pack 10 provided in one embodiment of the application, the heat-resistant component 32 is correspondingly arranged on the end 20a of the battery unit 20, so that the heat exchange amount of the end 20a is less than that of the intermediate portion 20b. In this way, the rate of temperature drop of the secondary battery 21 at the end 20a of the battery unit 20 can be easily kept consistent with the rate of temperature drop near the intermediate portion, which is conducive to reducing the possibility of temperature difference between the battery unit 20 near an end region 20a and the battery unit near an intermediate portion region 20b, reducing the possibility of unstable overall performance caused by temperature difference of the battery unit 20, and improving the working efficiency of the battery pack 10.

In one embodiment, with reference to FIG. 4, the heat-resistant component 32 includes a recessed portion 321 which extends in a direction, away from the end 20a, of the battery unit 20, and has a cavity and an opening towards the end 20a. In this embodiment, the distance between the recessed portion 321 and the end 20a is larger than the distance between the support 30 and the intermediate portion 20b, so as to reduce the heat exchange amount of the end 20a passing through the support 30; and the air in the cavity of the recessed portion 321 may also play a heat resistance effect. In one example, along the width direction Y of the battery unit 20, the size of the recessed portion 321 is larger than the width of the battery unit 20.

In one embodiment, with reference to FIGS. 3 and 4, the battery pack 10 includes a first end plate 40, a second end plate 50 and an outer frame 60, the battery unit 20 is arranged between the first end plate 40 and the second end plate 50, and the first end plate 40 is connected to the outer frame 60. In some examples, the first end plate 40 may be connected to the outer frame 60 by screws or welding, and the heat-resistant component 32 is correspondingly arranged on the end 20a, adjacent to the first end plate 40, on the battery unit 20. The battery unit 20 is arranged adjacent to the first end plate 40 which is connected to the outer frame 60, and the end 20a of the battery unit 20 exchanges heat with the outer frame 60 through the first end plate 40. By this time, the battery unit 20 can exchange heat with the first end plate 40 through the support 30. In one embodiment of the application, the provision of the heat-resistant component 32 on the end 20a of the battery unit 20 may effectively reduce the heat exchange amount of the end 20a of the battery unit 20 passing through the support 30 and the whole heat exchange amount of the battery unit 20, so as to effectively reduce the temperature difference between the end 20a and the intermediate portion 20b of the battery unit 20.

In one example, among all the secondary batteries 21 located at the end 20a, the heat-resistant component 32 is arranged corresponding to the secondary battery 21 adjacent to the first end plate 40. In the arrangement direction X, the secondary battery 21 adjacent to the first end plate 40 is located at the outermost side of the battery unit 20, and is easier to exchange heat, making the greatest temperature difference from the secondary battery 21 in the intermediate portion 20b. The provision of the heat-resistant component 32 at the secondary battery 21 adjacent to the first end plate 40 may effectively reduce the heat exchange amount of the secondary battery 21.

Figure 5:
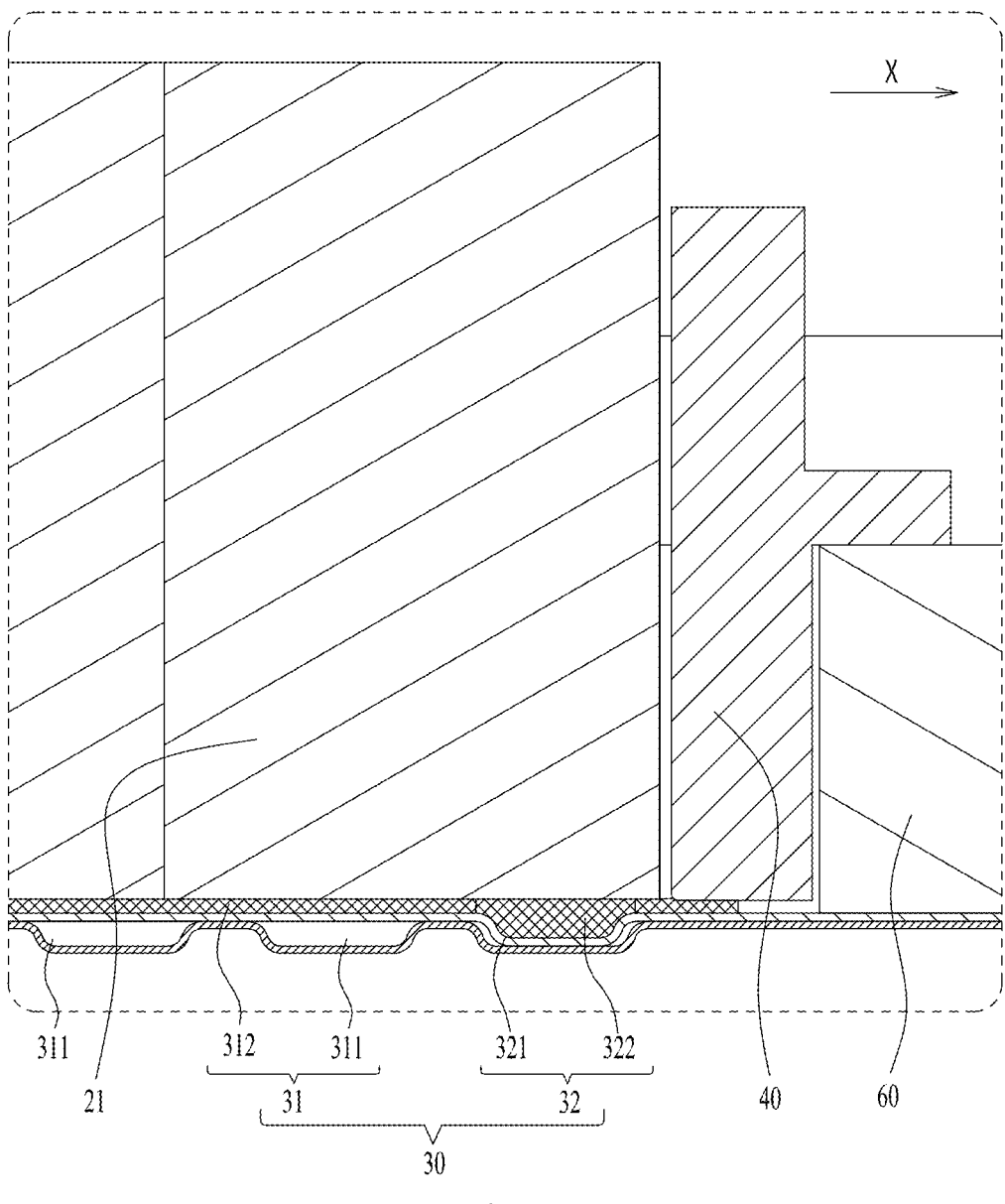
FIG. 5 is a cutaway view of a local structure of a battery pack disclosed in one embodiment of the application.

In one embodiment, with reference to FIG. 5, the heat-resistant component 32 further includes a thermal barrier 322 arranged in the recessed portion 321. The end 20a of the battery unit 20 is in contact with the thermal barrier 322 which is attached to the inner wall of the recessed portion 321. The thermal conductivity of the thermal barrier 322 is less than that of the body 31, allowing the thermal barrier 322 to reduce the heat exchange between the end 20a of the battery unit 20 and the support 30, and to further reduce the heat exchange amount of the end 20a of the battery unit 20 passing through the support 30.

In some embodiments, the material of the thermal barrier 322 may be structural adhesive, thermal grease, plastic or aerogel.

In one embodiment, the support 30 further includes a heat conducting component 312 which is located outside the heat-resistant component 32 to maintain good heat exchange between the secondary battery 21 and the support 30, thereby allowing the support 30 to exchange heat with the secondary battery 21 through the heat conducting component 312.

In some embodiments, the heat conducting component 312 may be structural adhesive or thermal grease.

In some embodiments, the material of the thermal barrier 322 is different from that of the heat conducting component 312. The thermal conductivity of the thermal barrier 322 is less than that of the heat conducting component 312.

In some embodiments, the material of the heat-resistant component 32 is the same as that of the heat conducting component 312. The thermal conductivity of the thermal barrier 322 is equal to that of the heat conducting component 312, and the thickness of the thermal barrier 322 is greater than that of the heat conducting component 312 arranged between other positions of the battery unit 20 and the body 31. In this way, the heat exchange amount of the end 20a of the battery unit 20 passing through the support 30 is less than that of other positions of the battery unit 20 passing through the support 30.

Figure 6:
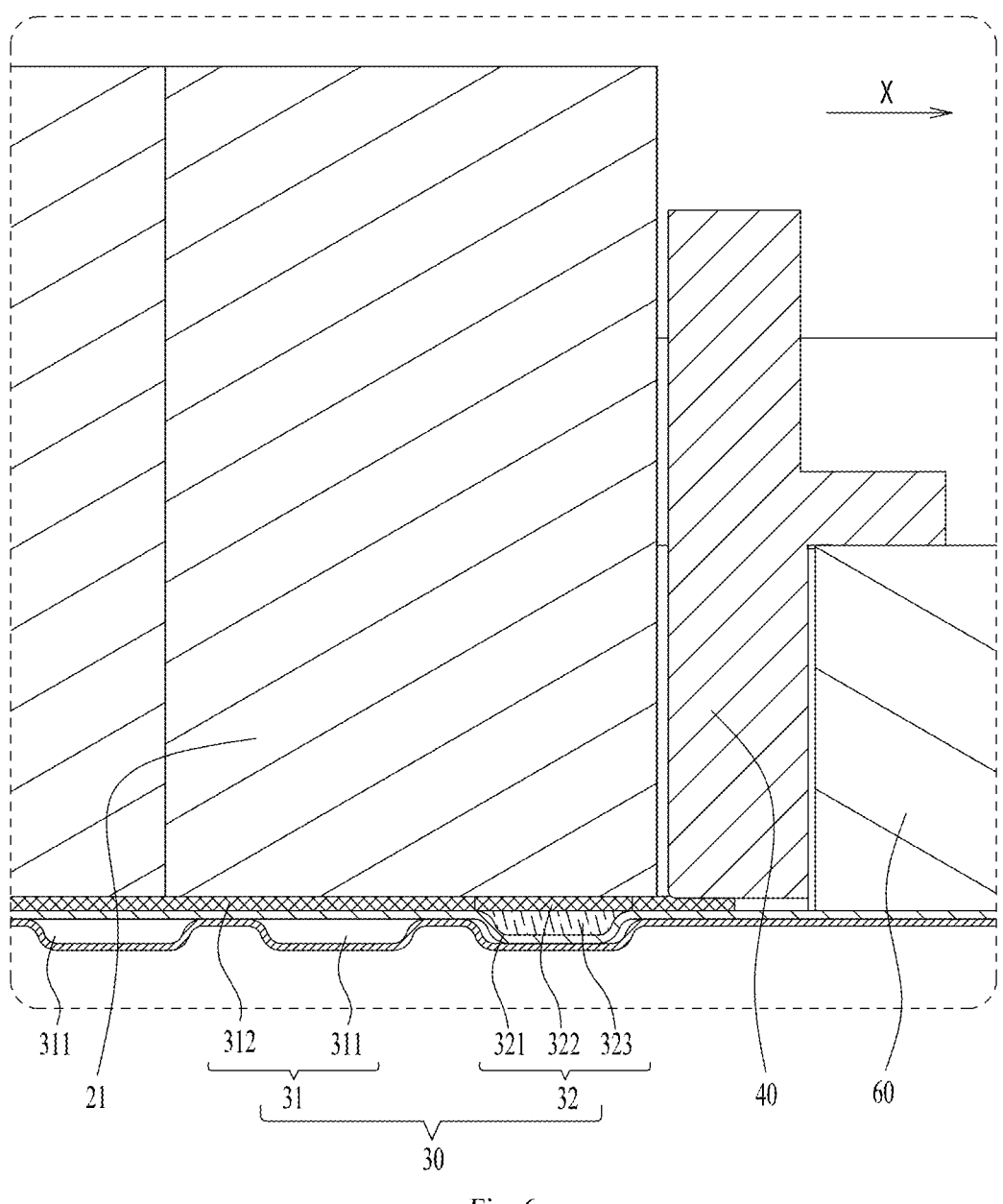
FIG. 6 is a cutaway view of a local structure of a battery pack disclosed in another embodiment of the application.

Furthermore, with reference to FIG. 6, the heat-resistant component 32 further includes a heat insulator 323 which is at least partially arranged in the recessed portion 321. The thermal conductivity of the heat insulator 323 is less than that of the thermal barrier 322, allowing the heat insulator 323 to further reduce the heat exchange amount of the end 20a of the battery unit 20 passing through the support 30. In some examples, the material of the heat insulator 323 is plastic, rubber, aerogel or silicone rubber. In this embodiment, the heat insulator 323 is located on one side, away from the end 20a of the battery unit 20, of the thermal barrier 322, which is located between the end 20a of the battery unit 20 and the heat insulator 323.

In one example, the surface of the end 20a, facing the battery unit 20, of the heat insulator 323 is flush with the opening of the recessed portion 321. The thickness of the thermal barrier 322 is equal to that of the heat conducting component 312 arranged between other positions of the battery unit 20 and the body 31, which is conducive to ensuring that the bottom of the secondary batteries 21 is flush with each other.

In some other embodiments, the heat insulator 323 may be located on one side, near the end 20a of the battery unit 20, of the thermal barrier 322. At least part of the thermal barrier 322 is arranged in the recessed portion 321, and the heat insulator 323 is located between the end 20a of the battery unit 20 and the thermal barrier 322.

Figure 7:
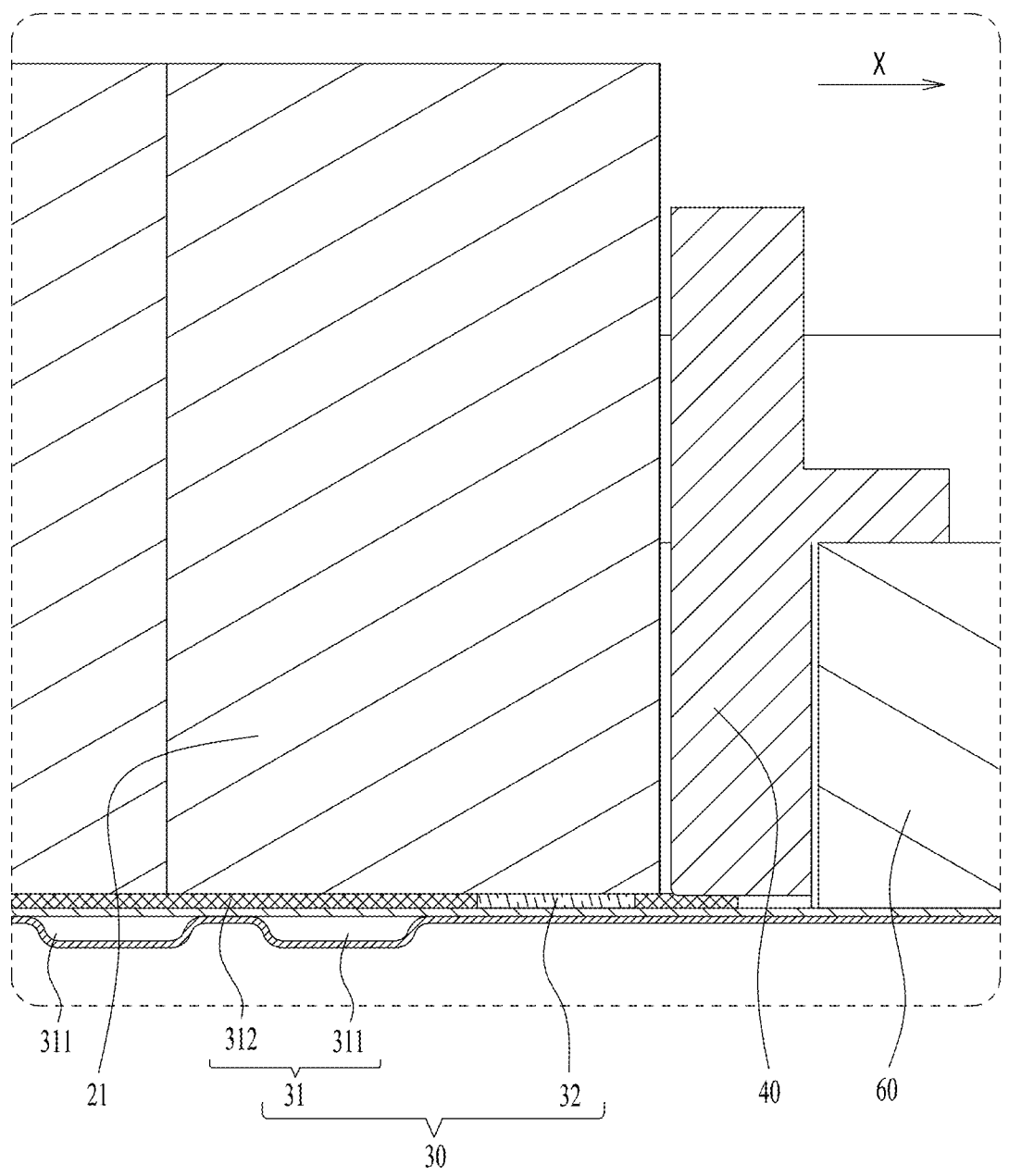
FIG. 7 is a cutaway view of a local structure of a battery pack disclosed in still another embodiment of the application.

In one embodiment, with reference to FIG. 7, the surface, facing the end 20a of the battery unit 20, of the body 31 of the support 30 may be a plane. The heat-resistant component 32 is correspondingly arranged on the end 20a of the battery unit 20. The thickness of the heat-resistant component 32 may be equal to that of the heat conducting component 312. The thermal conductivity of the heat-resistant component 32 is less than that of the heat conducting component 312, so that the heat exchange amount of the end 20a of the battery unit 20 passing through the support 30 is less than that of other positions of the battery unit 20 passing through the support 30.

Figure 8:
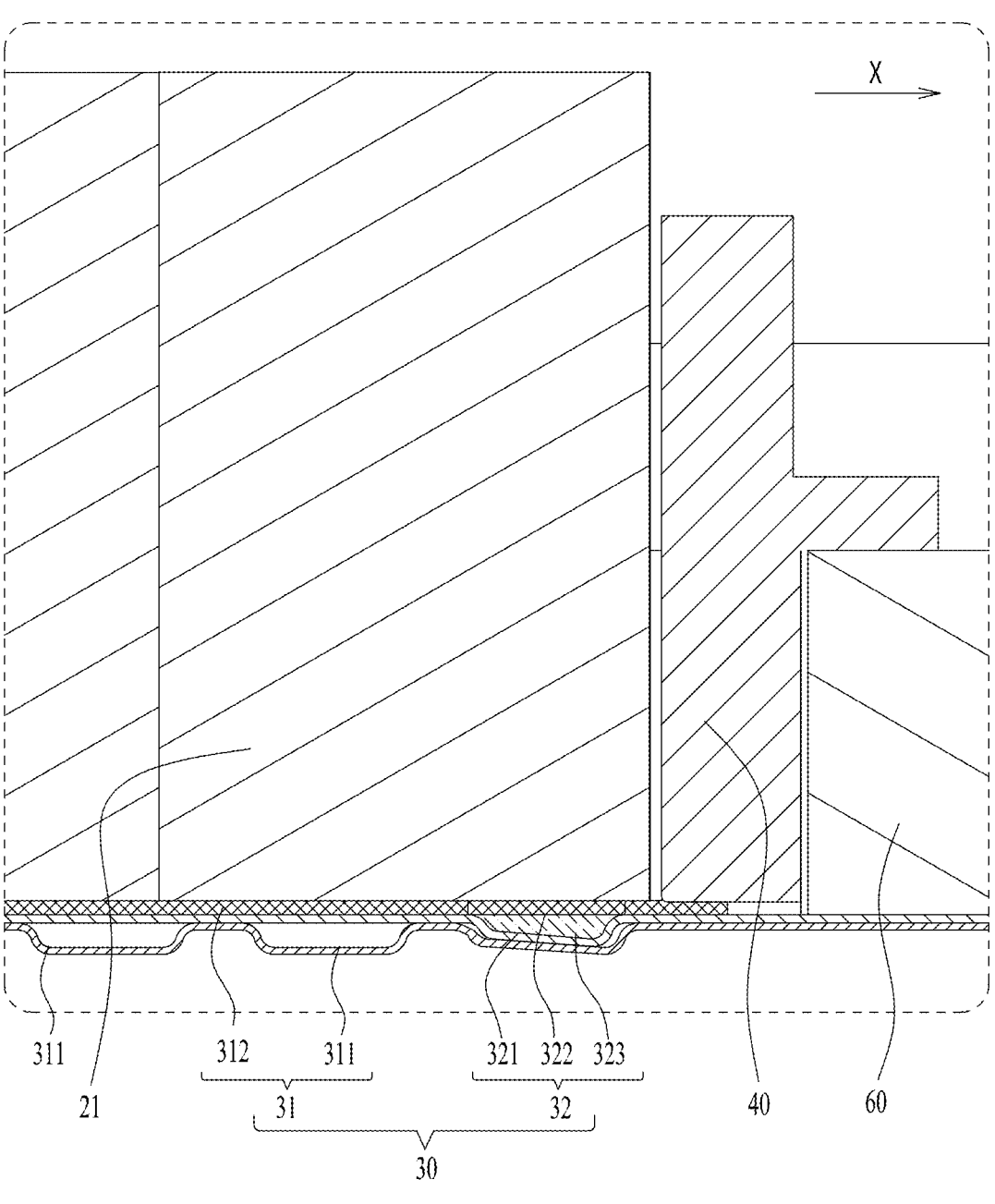
FIG. 8 is a cutaway view of a local structure of a battery pack disclosed in still another embodiment of the application.

In one embodiment, with reference to FIG. 8, the number of the recessed portion 321 is one. The depth of the recessed portion 321 gradually decreases in a direction from the end 20a to the intermediate portion 20b of the battery unit 20. The depth of the recessed portion 321 near the first end plate 40 is greater than the depth of the recessed portion 321 away from the first end plate 40, allowing the bottom wall of the recessed portion 321 to be inclined. The larger the depth of the recessed portion 321, the smaller the heat exchange amount in the corresponding area of the end 20a of the battery unit 20. The temperature of the battery unit 20 gradually changes in a direction from the end 20a to the intermediate portion 20b of the battery unit 20. The depth of the recessed portions 321 may be gradually changed depending on the temperature of the battery unit 20, which is conducive to further improving the consistency of heat exchange amount at the end 20a of the battery unit 20, balancing the temperature between the end 20a and the intermediate portion 20b of the battery unit 20, and reducing the temperature difference between the end 20a and the intermediate portion 20b of the battery unit 20.

Figure 9:
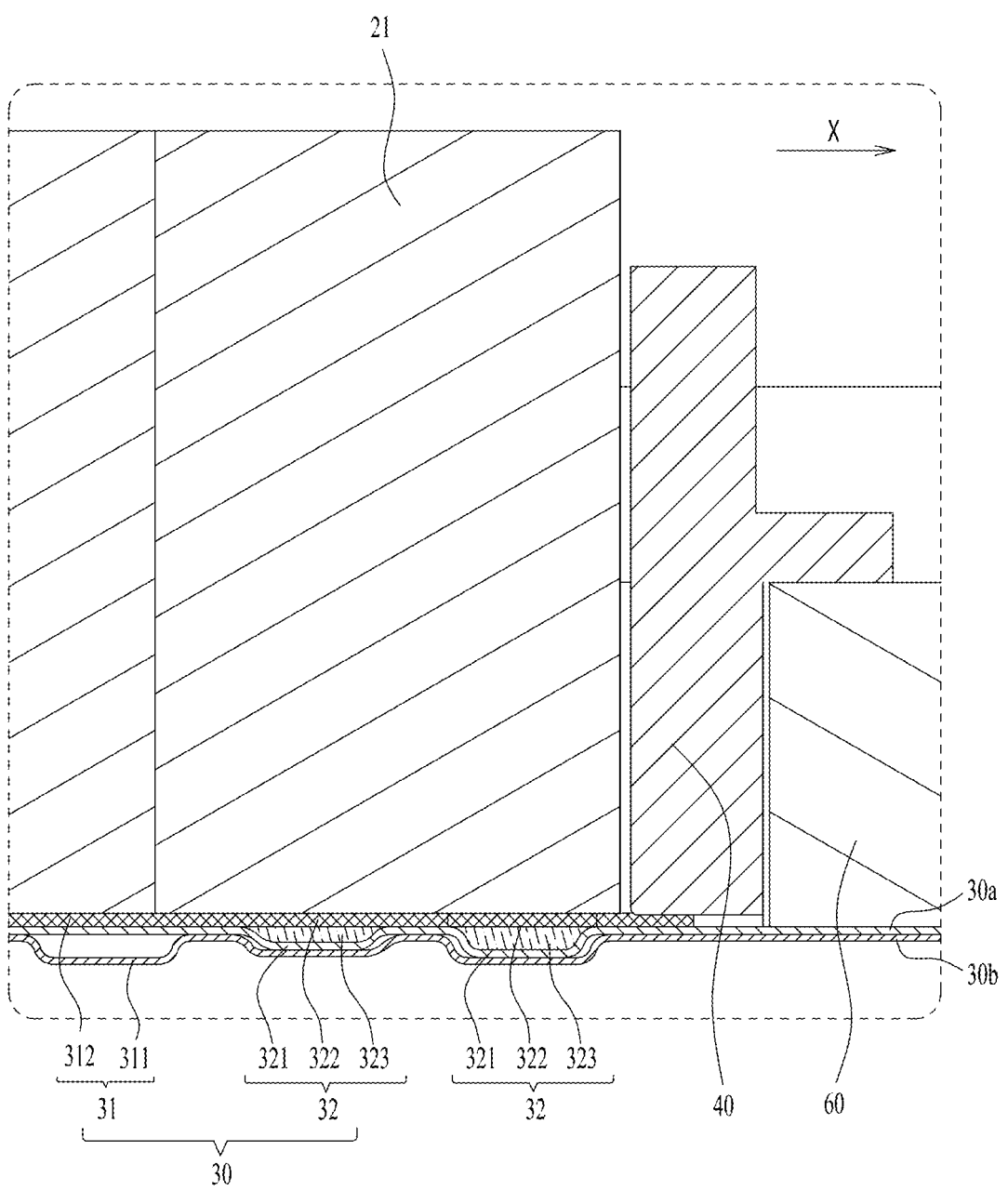
FIG. 9 is a cutaway view of a local structure of a battery pack disclosed in still another embodiment of the application.

In another embodiment, with reference to FIG. 9, the number of recessed portion 321 may be two. The depth of the two recessed portions 321 decreases sequentially in a direction from the end 20a of the battery unit 20 to the intermediate portion 20b of the battery unit 20. The depth of the recessed portion 321 near the first end plate 40 is greater than that of the recessed portion 321 away from the first end plate 40. The depth of the recessed portions 321 may be gradually changed depending on the temperature of the battery unit 20, which is conducive to further improving the consistency of heat exchange amount at the end 20a of the battery unit 20, balancing the temperature between the end 20a and the intermediate portion 20b of the battery unit 20, and reducing the temperature difference between the end 20a and the intermediate portion 20b of the battery unit 20. Understandably, the number of the recessed portion 321 is not limited to the above two, but may be three or more. In the two adjacent recessed portions 321, the depth of the recessed portion 321 near the first end plate 40 is greater than that of the recessed portion 321 far away from the first end plate 40.

In one embodiment, with reference to FIG. 9, the support 30 further includes a heat exchange component 311 which is configured to cool or heat the battery unit 20, or the corresponding secondary batteries 21. In the arrangement direction X, the heat exchange components 311 and the heat-resistant components 32 are arranged at intervals. In the vertical direction Z, the front projection of the heat-resistant component 32 on the battery unit 20 does not overlap with the front projection of the heat exchanging member 311 on the battery unit 20. The part of heat exchange component 311 and the heat-resistant component 32 are arranged corresponding to the end 20a. The heat exchange component 311 has a fluid channel through which a fluid medium passes. Typically, the fluid medium will preferentially heat or cool the end 20a, and then recirculate to the intermediate portion 20b which will be then heated or cooled.

Figure 10:
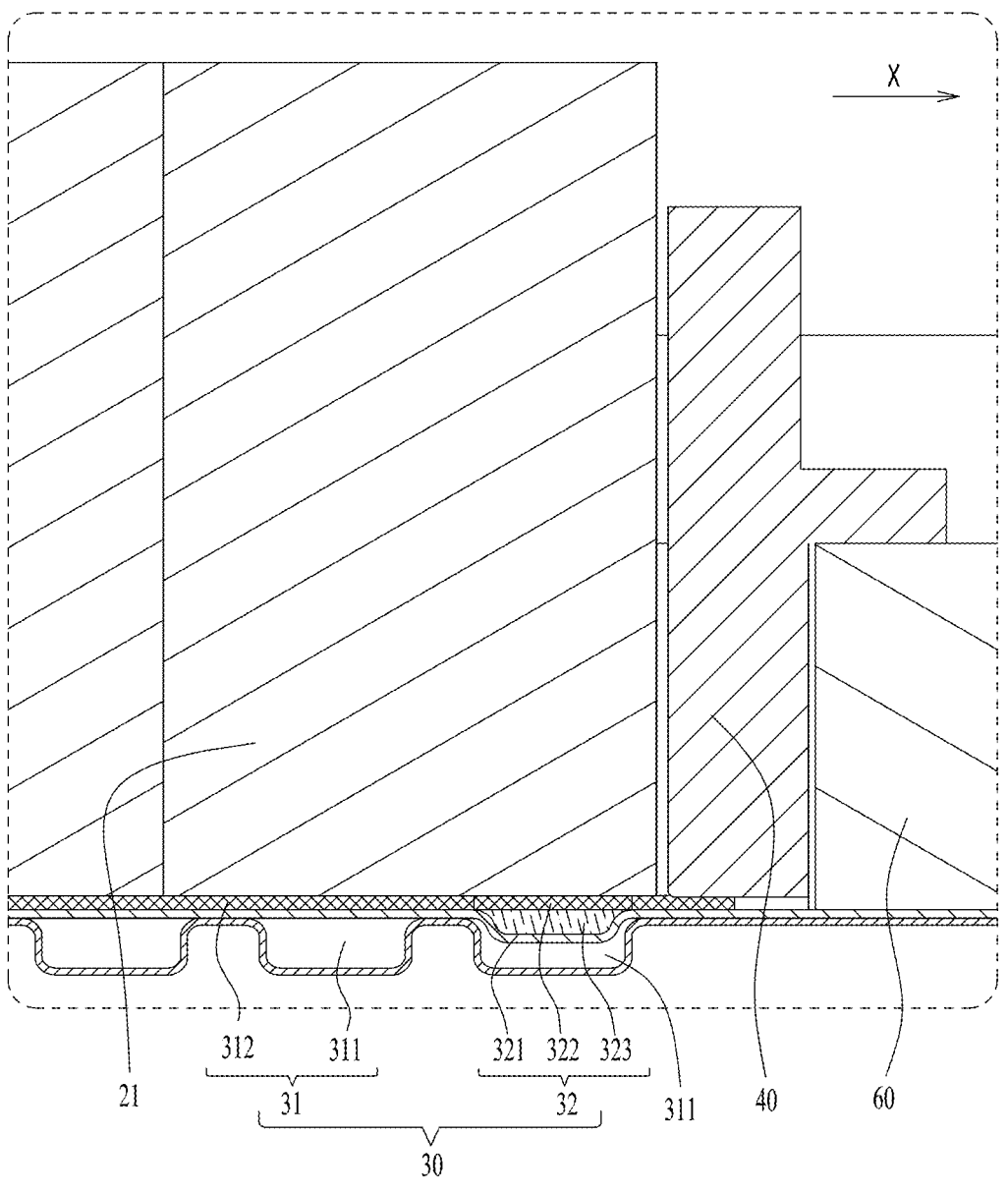
FIG. 10 is a cutaway view of a local structure of a battery pack disclosed in still another embodiment of the application.

In another embodiment, with reference to FIG. 10, part of the heat exchange component 311 is located on one side, away from the battery unit 20, of the heat-resistant component 32, so that the heat exchange amount between the part of the heat exchange component 311 and the end 20a of the battery unit 20 is less than that between other parts of the heat exchange component 311 and the end 20a of the battery unit 20.

In one example, the support 30 includes a first plate body 30a, and a second plate body 30b which is located on one side, away from the battery unit 20, of the first plate body 30a. The first plate body 30a and the second plate body 30b are connected to form a fluid channel, into which fluid can be introduced to cool or heat the battery unit 20.

The end 20a of the battery unit 20 is provided with the heat-resistant component 32; correspondingly, the heat exchange amount between the heat exchange component 311 and the end 20a is less than that between the heat exchange component 311 and the intermediate portion 20b per unit time, i.e., the temperature increase or drop of the end 20a is less than that of the intermediate portion 20b per unit time; therefore, when the heat exchange component 311 operates for a predetermined time, the end 20a and the intermediate portion 20b of the battery unit 20 can maintain consistent temperature, thus reducing the possibility of large temperature difference between the end 20a and the intermediate portion 20b of the battery unit 20.

Figure 11:
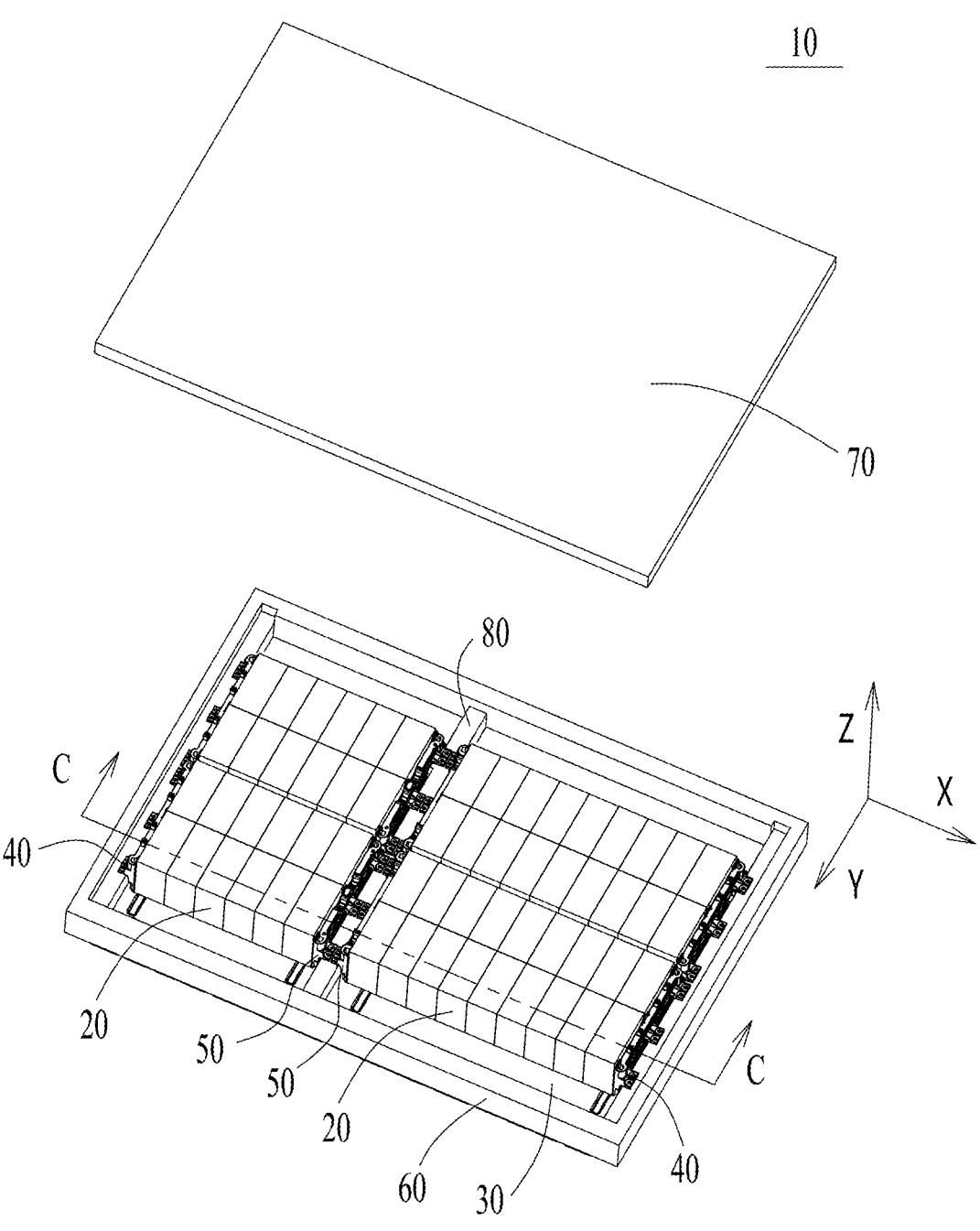
FIG. 11 is an exploded view of a battery pack disclosed in another embodiment of the application.

In one embodiment, with reference to FIG. 11, the battery pack 10 includes two groups of battery units 20 arranged along the arrangement direction X. Each group of battery units 20 includes four battery units 20 which are arranged side by side in a direction intersecting the arrangement direction X. The battery units 20 all form a layer of battery units 20 on the support 30, and the battery units 20 are supported by the support 30. Understandably, the arrangement of all the battery units 20 is not limited to the above modes, and an appropriate arrangement mode may be selected as required. The battery pack 10 may include one or three or more groups of battery units 20, and the number of the battery units 20 in each group is not limited to four, but may be three or more than five depending on the product requirements of the battery pack 10. Each battery unit 20 is connected to the outer frame 60 through the first end plate 40.

In one example, the battery pack 10 further includes a cross beam 80 provided on the support 30. The battery unit 20 is arranged between the cross beam 80 and the outer frame 60. The second end plate 50 of each battery unit 20 is connected to the cross beam 80.

Figure 12:
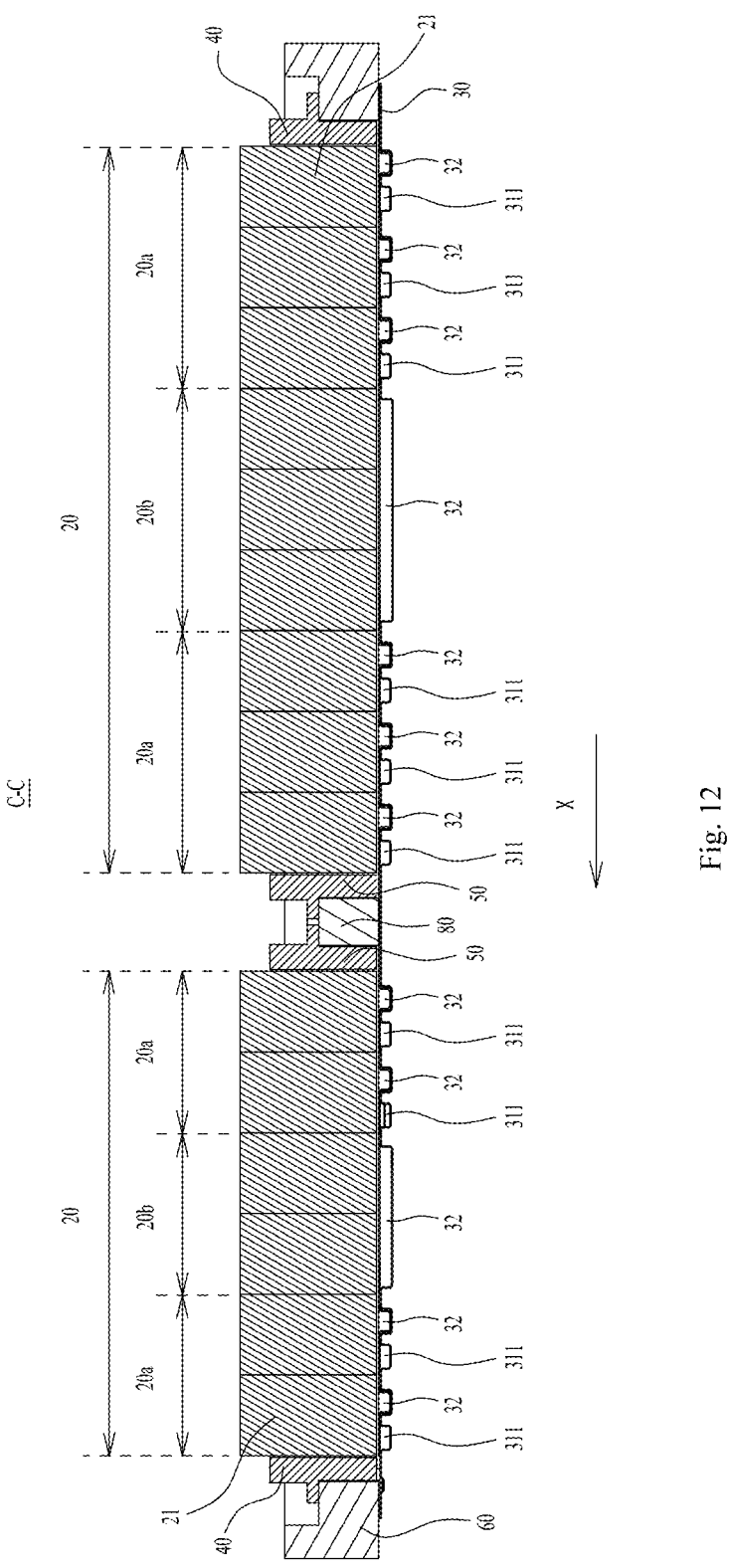
FIG. 12 is a cutaway view along the direction C-C in FIG. 11.

Referring to FIG. 12, for any group of battery units 20, in a direction intersecting with the arrangement direction X, the two battery units 20 located at the outermost side among the four battery units 20 are correspondingly provided with heat-resistant components 32, i.e., the ends 20a and the intermediate portions 20b of the two battery units 20 located at the outermost side are provided with heat-resistant components 32 respectively. The intermediate portions 20b of the two battery units 20 located at the outermost side are easy to exchange heat with the intermediate portion 20b of the battery units 20 located at the inner side, making a temperature difference between the intermediate portions 20b of the two battery units 20 located at the inner side. The heat-resistant component 32 in this embodiment may reduce the heat exchange amount of the intermediate portions 20b of the two battery units 20 located at the outermost side, so that the heat exchange amount of the intermediate portions 20b of the two battery units 20 located at the outermost side is less than that of the intermediate portions 20b of the two battery units 20 located at the inner side, which is beneficial to reducing the temperature difference between the two battery units 20 located at the outermost side and the two battery units 20 located at the inner side.

In some other embodiments, one of the two battery units 20 located at the outermost side is provided with a heat-resistant component 32; and the heat-resistant components 32 are correspondingly arranged on the end 20a and the intermediate portion 20b of the battery unit 20.

In one embodiment, with reference to FIG. 13, the application provides a manufacturing method of a battery pack, which includes:

providing a battery unit 20 which has an intermediate portion 20b and two ends 20a; and providing a support 30, configured to support the battery unit 20 and having a heat-resistant component 32 which is arranged corresponding to at least one of the ends 20a, so that the heat exchange amount of the end 20a passing through the support 30 is less than the heat exchange amount of the intermediate portion 20b passing through the support 30.

In the battery pack 10 in this embodiment and the battery pack 10 manufactured by the above-mentioned manufacturing method in the application, the support 30 includes the heat-resistant component 32 arranged corresponding to the end 20a of the battery unit 20, so that the heat exchange amount of the end 20a of the battery unit 20 passing through the support 30 is less than that of the intermediate portion 20b of the battery unit 20 passing through the support 30, which is beneficial to improving the consistency between the temperature of the end 20a of the battery unit 20 and the temperature of the intermediate portion 20b of the battery unit 20, and effectively reducing the temperature difference between the end 20a of the battery unit 20 and the intermediate portion 20b of the battery unit 20, so as to ensure the consistent temperature in all areas of the battery unit 20 and stable overall performance of the battery pack 10.

Although the application has been described with reference to preferred embodiments, various improvements can be made to the application and components can be replaced with equivalents without departing from the scope of the application. In particular, the technical features mentioned in the various embodiments can be combined in any way, provided that there is no structural conflict. The application is not limited to the particular embodiments disclosed herein, but includes all technical solutions falling within the scope of the claims.

What is claimed is:

1. A battery pack, comprising:
a battery unit, comprising two or more secondary batteries, and having an intermediate portion and two ends, the two ends being respectively located at two sides of the intermediate portion in an arrangement direction in which the secondary batteries are arranged; and
a support to support the battery unit, the support comprising a body and at least one heat-resistant component arranged thereon, the at least one heat-resistant component extending at least partially across one secondary battery among the two or more secondary batteries in a width direction perpendicular to the arrangement direction on at least one end of the two ends, so that a heat exchange amount between the at least one end of the two ends and the support is less than the heat exchange amount between the intermediate portion and the support, wherein
the at least one heat-resistant component does not contact the intermediate portion of the battery unit.

2. The battery pack according to claim 1, wherein:
the at least one heat-resistant component comprises a recessed portion extending in a depth direction away from the at least one end of the two ends, and a distance between the recessed portion and the at least one end of the two ends is larger than a support distance between the support and the intermediate portion in the depth direction.

3. The battery pack according to claim 2, wherein:
the at least one heat-resistant component further comprises a thermal barrier which is arranged in the recessed portion and has smaller thermal conductivity compared with the body.

4. The battery pack according to claim 3, wherein:
the at least one heat-resistant component further comprises a heat insulator which is at least partially arranged in the recessed portion and has smaller thermal conductivity compared with the thermal barrier.

5. The battery pack according to claim 4, wherein;
the heat insulator is located at one side of the thermal barrier,
the heat insulator being away from the at least one end of the two ends of the battery unit, and
the thermal barrier is located between the at least one end of the two ends of the battery unit and the heat insulator.

6. The battery pack according to claim 5, wherein:
a surface, facing the at least one end of the two ends of the battery unit, of the heat insulator is flush with an opening of the recessed portion.

7. The battery pack according to claim 6, wherein:
a quantity of the recessed portion is one, and a depth of the recessed portion extends in the depth direction perpendicular to the arrangement and the width directions and gradually decreases in a direction from the at least one end of the two ends to the intermediate portion; or
the quantity of the recessed portion is two or more, and the depth of the recessed portion extends in the depth direction and decreases sequentially in the direction from the at least one end of the two ends to the intermediate portion.

8. The battery pack according to claim 7, wherein:
three or more battery units form a group of battery units, the three or more battery units are arranged side by side in the width direction intersecting with the arrangement direction,
the at least one heat-resistant component does not contact the intermediate portion of at least one battery unit among the three or more battery units of the group of battery units, and
additional heat-resistant components are arranged on each secondary battery of at least one battery unit among two battery units located at an outermost side among the three or more battery units.

9. The battery pack according to claim 1, wherein:
the body comprises a heat exchange component to cool or heat the battery unit, and partially located at one side, away from the battery unit, of the at least one heat-resistant component; or
a front projection of the at least one heat-resistant component on the battery unit does not overlap with a front projection of the heat exchange component on the battery unit, and one part of the heat exchange component and the at least one heat-resistant component are arranged with respect to the at least one end of the two ends.

10. The battery pack according to claim 8, wherein:
the battery pack further comprises a first end plate, a second end plate and an outer frame, the at least one battery unit is arranged between the first end plate and the second end plate, the outer frame, inside which the at least one battery unit is located, is connected to the support and the first end plate, and the at least one heat-resistant component is arranged at the at least one end of the two ends adjacent to the first end plate.

11. The battery pack according to claim 10, wherein: the at least one heat-resistant component is arranged with respect to the secondary battery adjacent to the first end plate in all the secondary batteries located at the at least one end of the two ends.

12. The battery pack according to claim 11, wherein: the support further comprises a heat conducting component, and the support exchanges heat with the secondary battery through the heat conducting component located in an area other than the at least one heat-resistant component.

13. The battery pack according to claim 12, wherein: a surface, facing the at least one end of the two ends of the at least one battery unit, of the body of the support is a plane, a thickness of the at least one heat-resistant component is equal to a thickness of the heat conducting component, and a thermal conductivity of the at least one heat-resistant component is less than a thermal conductivity of the heat conducting component.

14. The battery pack according to claim 13, wherein: the support comprises a first plate body and a second plate body, the second plate body is located at one side, away from the at least one battery unit, of the first plate body, and the first plate body and the second plate body are connected to form a fluid channel.

15. An electric device, comprising: the battery pack according to claim 14.

16. A method for manufacturing a battery pack, comprising:

providing a battery unit, comprising two or more secondary batteries, the battery unit having an intermediate portion and two ends, the secondary batteries being arranged in an arrangement direction between the two ends; and providing a support to support the battery unit, the support having at least one heat-resistant component, the at least one heat-resistant component extending at least partially across one secondary battery among the two or more secondary batteries in a width direction perpendicular to the arrangement direction on at least one end of the two ends, so that a heat exchange amount of the at least one end of the two ends passing through the support is less than the heat exchange amount of the intermediate portion passing through the support, wherein the at least one heat-resistant component does not contact the intermediate portion of the battery unit.

17. The battery pack according to claim 1, wherein: the at least one heat-resistant component comprising two heat-resistant components, the at least one heat-resistant component among the two heat-resistant components being positioned at the at least one end of the two ends and another heat-resistant component among the two heat-resistant components being positioned at the other end of the two ends.

18. A battery pack, comprising:

a battery unit, comprising two or more secondary batteries, and having an intermediate portion and two ends, the two ends being respectively located at two sides of the intermediate portion in an arrangement direction in which the secondary batteries are arranged; and a support to support the battery unit, the support comprising a body and at least one heat-resistant component arranged thereon, the at least one heat-resistant component extending at least partially across one secondary battery among the two or more secondary batteries in a width direction perpendicular to the arrangement direction on at least one end of the two ends, so that a heat exchange amount between the at least one end of the two ends and the support is less than the heat exchange amount between the intermediate portion and the support, wherein:

the at least one heat-resistant component does not contact the intermediate portion of the battery unit, and the body comprises a heat exchange component arranged between a first end plate and a second end plate in a depth direction perpendicular to the arrangement and the width directions to cool or heat the battery unit, the heat exchange component partially located at one side of the at least one heat-resistant component and away from the battery unit, or a front projection of the at least one heat-resistant component arranged between the first end plate and the second end plate in the depth direction on the battery unit does not overlap with a front projection of the heat exchange component on the battery unit, and one part of the heat exchange component and the at least one heat-resistant component are arranged with respect to the at least one end of the two ends.

19. The battery pack according to claim 18, wherein: the heat exchange component arranged between the first end plate and the second plate in the depth direction having a fluid channel through which a fluid medium passes.

20. The battery pack according to claim 1, wherein: the body of the support supports the intermediate portion of the battery unit by extending in the width direction such that the intermediate portion contacts the body of the support in a depth direction, the at least one heat-resistant component contacts the at least one end of the two ends in the depth direction, and the at least one heat-resistant component does not contact the intermediate portion in the depth direction.

* * * * *